(12) United States Patent
Liu et al.

(10) Patent No.: US 8,873,819 B2
(45) Date of Patent: Oct. 28, 2014

(54) METHOD FOR SORTING CT IMAGE SLICES AND METHOD FOR CONSTRUCTING 3D CT IMAGE

(71) Applicant: GE Medical Systems Global Technology Company, Waukesha, WI (US)

(72) Inventors: Ping Liu, Beijing (CN); Jiaqin Dong, Beijing (CN); Shuang Wang, Beijing (CN)

(73) Assignee: GE Hangwei Medical Systems Co., Ltd., Beijing (CN)

( * ) Notice: Subject to any disclaimer, the term of this patent is extended or adjusted under 35 U.S.C. 154(b) by 109 days.

(21) Appl. No.: 13/754,389

(22) Filed: Jan. 30, 2013

(65) Prior Publication Data

US 2013/0195341 A1  Aug. 1, 2013

(30) Foreign Application Priority Data

Jan. 31, 2012 (CN) .......................... 2012 1 0031483

(51) Int. Cl.
*G06K 9/00* (2006.01)
*G06T 11/00* (2006.01)

(52) U.S. Cl.
CPC ................ *G06K 9/00* (2013.01); *G06T 11/005* (2013.01)
USPC .......................................... 382/128; 382/131

(58) Field of Classification Search
USPC ........................................................ 600/428
See application file for complete search history.

(56) References Cited

U.S. PATENT DOCUMENTS

| | | | | |
|---|---|---|---|---|
| 7,443,946 B2 * | 10/2008 | Deller et al. | ....................... | 378/8 |
| 7,574,249 B2 * | 8/2009 | Piacsek et al. | ................ | 600/425 |
| 7,769,430 B2 * | 8/2010 | Mostafavi | ...................... | 600/428 |
| 7,868,884 B2 * | 1/2011 | Sirohey et al. | ................ | 345/419 |
| 8,200,315 B2 * | 6/2012 | Mostafavi | ...................... | 600/428 |
| 8,358,738 B2 * | 1/2013 | Brown | ............................ | 378/65 |
| 8,391,955 B2 * | 3/2013 | Erbel et al. | .................... | 600/425 |
| 8,526,702 B2 * | 9/2013 | Johnston et al. | .............. | 382/131 |
| 8,594,769 B2 * | 11/2013 | Mostafavi | ...................... | 600/428 |
| 8,731,257 B2 * | 5/2014 | Brown | ........................... | 382/128 |

(Continued)

OTHER PUBLICATIONS

Low et al., "A method for the reconstruction of four-dimensional synchronized CT scans acquired during free breathing", Medical Physics 30, 1243, 2003.*

(Continued)

*Primary Examiner* — Anand Bhatnagar
*Assistant Examiner* — Soo Park
(74) *Attorney, Agent, or Firm* — Global Patent Operation; Marc A. Vivenzio

(57) ABSTRACT

A method for sorting CT image slices comprising, if no image slice comprises a target respiratory phase at a couch position, determining a target breathing feature value corresponding to the target respiratory phase based on a respiratory motion curve of a scanned patient, searching from a plurality of image slices at the couch position for one or more image slices comprising a breathing feature value close to the target breathing feature value to serve as candidate image slices, and selecting, based on a breathing feature value difference between the breathing feature value of each of the candidate image slices and the target breathing feature value and/or an image difference between each of the candidate image slices and at least one reference image slice, a single image slice from the candidate image slices for constructing the 3D CT image for the target respiratory phase.

8 Claims, 3 Drawing Sheets

(56) References Cited

U.S. PATENT DOCUMENTS

| | | |
|---|---|---|
| 2007/0286331 A1 | 12/2007 | Keall |
| 2009/0225957 A1 | 9/2009 | Varchena |
| 2010/0202673 A1 | 8/2010 | Zhang |
| 2012/0059252 A1* | 3/2012 | Li et al. .......... 600/425 |
| 2012/0078083 A1* | 3/2012 | McConnell et al. .......... 600/413 |
| 2012/0078089 A1* | 3/2012 | Wollenweber et al. .......... 600/427 |
| 2012/0083681 A1* | 4/2012 | Guckenburger et al. .......... 600/407 |
| 2012/0146641 A1* | 6/2012 | Wu et al. .......... 324/309 |
| 2012/0307964 A1* | 12/2012 | Hall et al. .......... 378/8 |

OTHER PUBLICATIONS

Heron, "Guiding Radiation Therapy Planning with 4D CT", Advantage4D—Radiation Oncology Clinical Value, GE Healthcare CT Publication, Fall 2007, p. 41-44.

Li et al., "4D CT Sorting based on patient internal anatomy", Phys. Med. Biol., vol. 54, pp. 4821-4833, 2009.

* cited by examiner

A. Distorted tumor contour

B. organ surface split before the compensation     after the compensation

A before the compensation     after the compensation

B

METHOD FOR SORTING CT IMAGE SLICES AND METHOD FOR CONSTRUCTING 3D CT IMAGE

BACKGROUND OF THE INVENTION

1. Field of the Invention

Embodiments of the present invention relate to the field of computerized tomography (CT) and, more particularly, to a method for sorting CT image slices and a method for constructing a 3-dimensional (3D) CT image using the sorted CT image slices.

2. Description of the Prior Art

Patient's respiratory motion during free-breathing CT scan may cause significant distortions in target contouring of tumors in the 3D image of the thorax and the upper abdomen. In order to eliminate or reduce the effect caused by respiratory motion generated artifacts on the CT scan of the chest and abdomen of the patient, achieving the purpose of accurate diagnosis and treatment, the concept of four-dimensional (4D) CT has been proposed. The 4D CT technique has been widely used for treatment simulation of thoracic and abdominal cancer radiotherapy. 4D CT can be accomplished by over-sampling CT slices at each couch (Z direction) position, and then sorting all images (slices) into multiple CT volumes corresponding to different respiratory states. Each CT series (volume) is a 3D image of a specific respiratory state, and each 3D image is formed by overlapped slices chosen from different couches (one slice in one couch position). FIG. 1 schematically illustrates this sorting mechanism.

Currently two types of 4D CT methods are researched: one is an external Device-based 4D CT, and the other is a Device-less 4D CT method. The external device-based method is represented by Advantage 4D (A4D) CT which utilizes external respiratory signals, and the device-less method is represented by 4D CT sorting based on the patient's internal anatomy (Device-less 4D, i.e., D4D), with the respiratory signals thereof being extracted from the patient's internal image features.

A4D CT has been widely used for eliminating respiratory motion. This method requires the use of a Real-time Position Management (RPM) device (which includes complicated hardware and software) as an external device to monitor the respiratory motion of a patient. The general process of A4D CT is as follows: monitoring the respiratory motion of a patient using a respiration monitoring system connected to the CT device during the process of image collection, collecting CT images and respiratory signals simultaneously, "stamping" each layer of the collected CT images with time information indicative of its phase during the breathing circle (i.e., respiratory phase), sorting all the CT images according to the respiratory phase, and performing a 3D reconstruction based on the sorted images, wherein the 3D images for each of the respiratory phases constitute a 3D image sequence varying over time, hence referred to as 4D CT.

Current A4D CT systems mostly use a spirometer to measure the respiratory capacity of a patient, or an infrared camera device to measure the amplitude difference of movement of the patient's body surface during breathing, or a pressure sensor or the like to measure the pressure difference caused by breathing, and then convert the measured signals into breathing cycle signals. In such systems, CT images are generally collected in cinema mode (CINE mode) in the following manner: CT image collection is performed continuously in a certain period of time at a couch position. After a CINE mode scan at one couch position is completed, CT scan is then performed at the next couch position to repeat the same CINE mode scan. The whole process repeats until the entire desired scan scope is scanned.

In recent years, some D4D CT methods have been disclosed. A most representative one of these methods is proposed by Ruijiang Li, et al. in their paper "4D CT sorting based on patient internal anatomy", PHYSICS IN MEDICINE AND BIOLOGY, 54 (2009) 4821-4833. In that paper, Li, et al. proposed a sorting method based on D4D CT, which is incorporated herein in its entirety for reference. In the method, four internal anatomy features (including the air content, lung area, lung density and body area) are introduced, and a measure called spatial coherence is used to select the optimal internal feature at each couch position and to generate the respiratory curves for 4D CT sorting based on the selected optimal internal feature. The method eliminates the use of an external instrument for recording respiratory motion synchronously and can be implemented in medical devices while reducing cost.

Existing 4D CT techniques are also described in US patent applications US20090225957, US20100202673, US20070286331, etc.

An important parameter for 4D CT is the sampling rate. A denser sampling means collecting more CT slices during one breathing cycle, which is helpful to improve 4D sorting accuracy and decrease the image mismatch between two adjacent Z (couch) positions. However, in most clinical 4D CT scans, there are always some reasons which prevent the sampling rate from being set too dense, such as the requirement for reducing X-ray dose to the patient, the limitation of the total CT slice number and the storage ability, or the requirement for improving scan and processing speed. Therefore, 4D CT slices are mostly generated by sparse sampling, and mismatches along the Z direction in the 3D images often occur, which can lead to a certain degree of tumor contour defect or organ surface split, as shown by circles in FIGS. 2A and 2B.

There are two aspects about the impacts caused by low sampling rate. One is the insufficiency of sampling points in the whole breathing cycle. For example, assume there are less than 10 sampling points in one breathing cycle. If we plot 10 phases for one cycle, then there must be at least one point used as two phases. Consequently, about 10% mismatches are caused by insufficient sampling rate. The second aspect may cause even more serious mismatch. It is found that in different phases of one breathing cycle, the moving speeds of the body or organ are different; especially in the middle phase of expiration, a small difference in phase corresponds to a bigger organ (body) movement. Thus, even if the sampling rate is high for the whole breathing cycle, it may still be relatively sparse for the special fast moving phase, as shown by the example in FIG. 3. In FIG. 3, the curve represents the respiratory motion curve of the patient, and the elliptic points represent the breathing data extracted from each image slice at one couch position, wherein the Y-axis represents the breathing feature value (namely, the amplitude of the body or organ movement during the patient's breathing) extracted from the image slices, and the X-axis represents the time at which the image slice is scanned (which corresponds to the respiratory phase). As can be seen from FIG. 3, the breathing feature values change dramatically in the middle of the expiration phase (as shown by the red circle), and sampling rate is especially insufficient for these parts. By checking the 3D CT images, it is discovered that 3D mismatch mainly occurs in these situations.

As shown in FIG. 3, a small phase error (3% difference) causes a big amplitude difference (31% difference). Therefore, for two adjacent couch (Z) CT slices, when they are stacked to a 3D image, if there is a small phase shift between the two samples, then the two images chosen may have obviously different appearance, thereby causing an obvious mismatch along the Z direction in the resulting 3D image.

BRIEF SUMMARY OF THE INVENTION

According to an embodiment of the present invention, there is provided a method for sorting CT image slices. The method comprises determining a breathing feature value and a respiratory phase for each image slice of the CT image slices, wherein the CT image slices comprise a plurality of image slices at each of a plurality of couch positions, and, for a target respiratory phase, sorting an image slice comprising the target respiratory phase from the plurality of image slices at each of the plurality of couch positions for constructing the 3D CT image for the target respiratory phase. If no image slice comprises the target respiratory phase at a couch position, the method further comprises determining a target breathing feature value corresponding to the target respiratory phase based on a respiratory motion curve of a scanned patient, searching from the plurality of image slices at the couch position for one or more image slices comprising a breathing feature value close to the target breathing feature value to serve as candidate image slices, and selecting, based on a breathing feature value difference between the breathing feature value of each of the candidate image slices and the target breathing feature value and/or an image difference between each of the candidate image slices and at least one reference image slice, a single image slice from the candidate image slices for constructing the 3D CT image for the target respiratory phase.

BRIEF DESCRIPTION OF THE DRAWINGS

In order to enable a thorough understanding of the present invention, the present invention is described hereunder in greater detail with reference to the drawings, wherein.

DETAILED DESCRIPTION OF EXEMPLARY EMBODIMENTS OF THE INVENTION

Embodiments of the present invention relate to a method of automatic compensation for the sorting result in low sampling rate 4D CT. According to embodiments of the present invention, a Virtual Interpolated Compensation technology successfully improves 4D CT sorting result performance by compensating the defects caused by sparse sampling. The technology according to embodiments of the present invention effectively address the issues noted in the above-mentioned second aspect about the impacts caused by low sampling rate.

The following is a detailed description of the specific embodiments of the present invention. However, it will be appreciated that the present invention is not limited to said specific embodiments.

Figure 1:
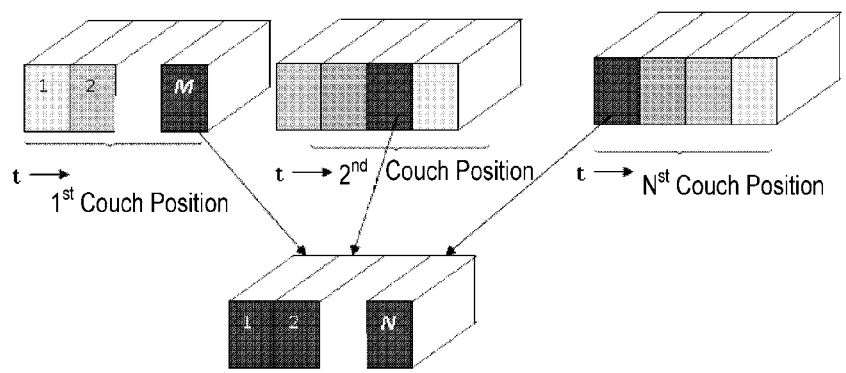
FIG. 1 is a schematic diagram showing a CT image slice sorting mechanism in the prior art.
Figure 2:
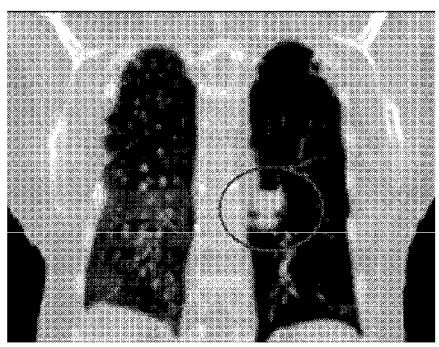
FIGS. 2A-2B are schematic diagrams showing defects in 3D CT images caused by insufficient sampling rate.
Figure 2:
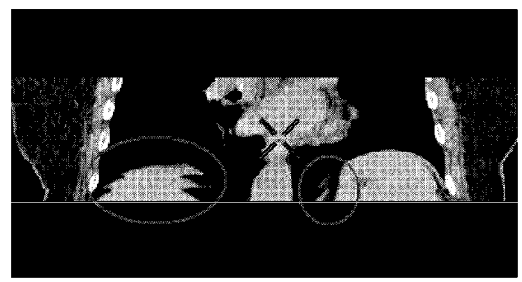
Figure 3:
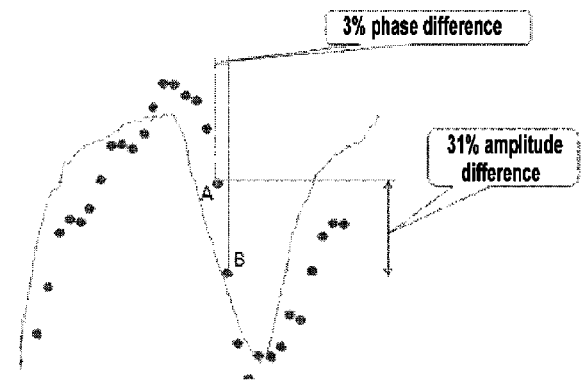
FIG. 3 is a schematic diagram showing a case of insufficient sampling rate in 4D CT.
Figure 4:
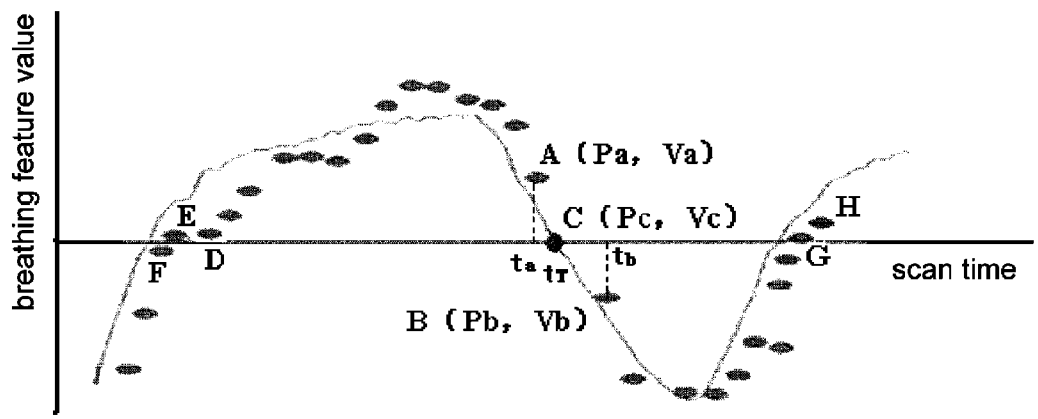
FIG. 4 illustrates a circumstance where the image slice sorting method according to an embodiment of the present invention is to be applied.

FIG. 4 schematically illustrates a circumstance where the image slice sorting method according to an embodiment of the present invention is to be applied. In FIG. 4, the elliptic points represent the corresponding breathing data extracted from each image slice at a certain couch position, wherein the longitudinal axis represents the breathing feature value (namely, the amplitude of the body or organ movement during the patient's breathing) extracted from the image slices, and the lateral axis represents the time at which the image slice is scanned (which corresponds to the respiratory phase). Besides, in order to facilitate observation, FIG. 4 also shows the respiratory motion curve of the patient obtained through analysis and computation. It shall be understood that theoretically the respiratory motion curve of the patient should completely overlap the curve connecting said elliptic points. In practice, however, they do not completely overlap as shown in FIG. 4 due to such reasons as errors in image processing, errors in curve fitting, and so on.

As stated above, in constructing a 3D CT image, image slices having the same target respiratory phase are chosen from the image slices obtained at each couch position, and then said image slices having the same target respiratory phase are stacked to form a 3D CT image. For each couch position, one image slice having the target respiratory phase is chosen to construct a 3D CT image for said target respiratory phase. Generally, prior to sorting, the respiratory phase of each image slice has been determined through analysis of the breathing feature values of the image slices, and the respiratory motion curve of the patient has been obtained through the collection or analysis of the image slices via an external breathing monitoring device. The breathing feature value is a numerical value extracted from an image slice for characterizing the respiratory motion of a patient when the image slice is scanned. This value is usually represented by the amplitude of a certain area of or a certain marker on the patient body due to the respiratory motion of the patient. The respiratory motion curve of a patient is a curve characterizing the relationship between the amplitude of the respiratory motion of the patient versus time. The methods for extracting the breathing feature value, determining the respiratory phase of the image slices, and obtaining the respiratory motion curve of a patient are all well known to persons skilled in the art and are not described herein for the sake of conciseness.

In FIG. 4, the longitudinal axis of the elliptic points represent the breathing feature values extracted from each image slice at the couch position $C_m$, and the X-coordinates represent the scan time of the image slices. With reference to the respiratory motion curve of the patient, it is possible to determine a periodic relationship between the scan time and the respiratory phase, and to indicate the respiratory phase on the X-axis. Assume that we need to sort the image slices having the respiratory phase $P_T$ from the image slices at each couch position to construct a 3D CT image. However, there may be such a case that an image slice having the respiratory phase $P_T$ does not exist in all the image slices at the couch position $C_m$. In FIG. 4, point A corresponds to the image slice $S_a$, which has a y-coordinate (namely, the breathing feature value extracted from the image slice) $V_a$, an x-coordinate (scan time) $t_a$, and a corresponding respiratory phase $P_a$; and point B corresponds to the image slice $S_b$, which has a y-coordinate (namely, the breathing feature value extracted from the image slice) $V_b$, an x-coordinate (scan time) $t_b$, and a corresponding respiratory phase $P_b$. As shown in FIG. 4, $P_T$ is located between $P_a$ and $P_b$, but there is no breathing feature value corresponding to $P_T$. That is, no image slice had been scanned for respiratory phase $P_T$ at the couch position $C_m$. The point C as indicated by circle point in FIG. 4 is not a point formed from the breathing feature value of an actual image slice. As shown, points A, B, and C are in the middle phase of expiration, and they differ significantly in the breathing feature values, but slightly in the respiratory phase. If $S_a$ or $S_b$ is chosen as the image slice corresponding to the respiratory phase $P_T$ to construct the 3D CT image for the target respiratory phase $P_T$, then the resultant 3D CT image may suffer from the above-mentioned defects due to a large difference between the breathing feature value of point A and B and that corresponding to the target respiratory phase $P_T$. Moreover, if point C falls exactly at the middle position between points A and B, then it will be difficult whether $S_a$ or $S_b$ should be chosen. Therefore, neither $S_a$ nor $S_b$ is suitable to serve as a candidate slice for point C.

An embodiment of the present invention addresses the above-mentioned issue by providing a method for sorting image slices based on a virtual interpolation technology. It is called "a virtual interpolation technology" because the image slice chosen using the method of the present invention is an image slice $S_c$ that best matches point C, as if image slice $S_c$ had been formed between the actual slices $S_a$ and $S_b$ through interpolation—in effect the embodiment does not really form an image slice $S_c$ through interpolation, but chooses an existing image slice from the candidate image slices based on certain criteria to serve as $S_c$ for constructing the 3D CT image for the target respiratory phase $P_T$.

The following describes in detail methods for sorting image slices and methods for constructing a 3D CT image according to embodiments of the present invention.

To address the above-mentioned problem of nonexistence of an image slice corresponding to the target respiratory phase, instead of directly selecting an image slice $S_a$ or $S_b$ having a respiratory phase approximating that of the target respiratory phase, the image slice sorting method according to embodiments of the present application selects a most suitable image slice from candidate image slices based on certain criteria. An initial step in the method is to determine the candidate image slices from the image slices at the couch position $C_m$. In an embodiment of the present invention, image slices at the couch position $C_m$ having a breathing feature value close to (for example, the breathing feature value difference is less than 1 pixel, or less than 0.1, in the case of normalized breathing feature values) the target breathing feature value corresponding to the target respiratory phase are chosen as the candidate image slices. Note that said breathing feature value difference is measured in absolute value, i.e., the absolute value of the difference between the breathing feature value of the observed image slices and the target breathing feature value. Therefore, in order to determine the candidate image slices, the target breathing feature value $V_T$ corresponding to the target respiratory phase $P_T$ need to be first determined based on the respiratory motion curve of the patient. Next, a search is made to find from all the image slices at the couch position Cm for those image slices having a breathing feature value close to $V_T$ to serve as the candidate image slices. In the embodiment shown in FIG. 4, image slices $S_d$, $S_e$, $S_f$, $S_g$, $S_h$ corresponding to points D, E, F, G, and H are chosen as the candidate slices.

In an embodiment of the present invention, an image slice is selected from the candidate image slices based on a breathing feature value difference between a breathing feature value of each candidate image slice and the target breathing feature value, for constructing a 3D CT image for said target respiratory phase. In this embodiment, the breathing feature value difference (the absolute value) between the respective breathing feature values $V_d$, $V_e$, $V_f$, $V_g$, $V_h$ of the candidate image slices $S_d$, $S_e$, $S_f$, $S_g$, $S_h$ and the target breathing feature value $V_T$ is calculated, and one image slice with the smallest breathing feature value difference is chosen as $S_c$.

In an embodiment of the present invention, an image slice is selected from said candidate image slices based on the image difference between each candidate image slice and a reference image slice, for constructing the 3D CT image for said target respiratory phase. In an embodiment, a first reference image slice and a second reference image slice are selected in the following manner from all the image slices at the couch position $C_m$ to be used as the reference image slice: the first reference image slice and the second reference image slice are two adjacent image slices in terms of the scan time, and a virtual scan time corresponding to the target respiratory phase falls between the scan time of the first reference image slice and the scan time of the second reference image slice. As shown in FIG. 4, the scan time corresponding to the target respiratory phase $P_T$ is $t_T$ and this $t_T$ falls between the scan time $t_a$ of $S_a$ and the scan time $t_b$ of $S_b$. Therefore, in said embodiment, Sa and Sb are used as the first reference image slice and the second reference image slice. Then, image processing technology is used to obtain a first image difference between each candidate image slice and the first reference image slice and a second image difference between each candidate image slice and the second reference image slice. For example, the candidate image slices and the first and second reference image slices can first be binarized, and then a subtraction is performed between the binarized data of the candidate image slices and the binarized data of the first and second reference image slices respectively to obtain the first image difference and the second image difference. It shall be appreciated that persons skilled in the art can conceive of other image processing, analyzing or comparing technologies to obtain said first image difference and said second image difference. Such image processing, analyzing or comparing technologies are assumed to be well known to persons skilled in the art and are not described herein for the sake of conciseness. Likewise, said first and second image differences are both absolute values.

In an embodiment of the present invention, the first image difference and the second image difference of each candidate image slice are multiplied by a respective weight, and a bigger one from the weighted first image difference and the weighted second image difference is selected as the image difference between said candidate image slice and the reference image slice. Given that the first and second reference image slices have been determined, the weight of the first image difference and the weight of the second image difference are constant with respect to each of the image slices. The weight of the first image difference and the weight of the second image difference depend on the difference between the breathing feature value of the first reference image slice and the target breathing feature value and the difference between the breathing feature value of the second reference image slice and the target breathing feature value. In general, the sum of the weight of the first image difference and the weight of the second image difference is 1. Besides, the greater the difference between the breathing feature value of the first reference image slice and the target breathing feature value, the smaller the weight of the first image difference; likewise, the greater the difference between the breathing feature value of the second reference image slice and the target breathing feature value, the smaller the weight of the second image difference. In an embodiment, the weight of the first image difference is inversely proportional to the difference between the breathing feature value of the first reference image slice and the target breathing feature value; the weight of the second image difference is also inversely proportional to the difference between the breathing feature value of the second reference image slice and the target breathing feature value. For example, the ratio of the weight of the first image difference to the weight of the second image difference is the reciprocal of the ratio of the difference between the breathing feature value of the first reference image slice and the target breathing feature value to the difference between the breathing feature value of the second reference image slice and the target breathing feature value. It shall be appreciated by those skilled in the art that other relations between the weight and the breathing feature value difference of the reference image slice are also possible so long as the weight can properly reflect the importance of the two reference image slices in the process of sorting.

After the image difference for each reference image slice has been determined, the image slice having the minimum image difference is selected from the candidate image slices to serve as $S_c$.

In an embodiment of the present invention, an image slice is selected from the candidate image slices to serve as $S_c$ based on both a breathing feature value difference between a breathing feature value of each candidate image slice and the target breathing feature value and an image difference between each candidate image slice and a reference image slice, for constructing a 3D CT image for said target respiratory phase. In an embodiment, an image slice having a minimum combined difference value with respect to the breathing feature value difference and the image difference is selected from the candidate image slices to serve as $S_c$. Specifically, the breathing feature value difference and the image difference are calculated for each of the candidate image slices in the above described manner. Then, the breathing feature value differences for all candidate image slices are normalized to obtain a normalized breathing feature value difference for each candidate image slice; meanwhile, the image differences between each of the candidate image slices and the reference image slice are normalized to obtain a normalized image difference for each candidate image slice. Since normalization is a well known data processing method in the prior art, it is not described in detail herein for the purpose of clarity. Next, the normalized breathing feature value difference for each candidate image slice and the normalized image difference for each candidate image slice are summed to obtain a combined difference value for each candidate image slice, the combined difference values of the candidate image slices are compared, and the image slice having the minimum combined difference value is selected to serve as $S_c$.

Although the first reference image slice $S_a$ and the second reference image slice $S_b$ do not belong to the candidate image slices in the above description, it is to be understood that Sa and $S_b$ can either serve as the reference image slice or serve as the candidate image slices.

After one suitable image slice has been sorted for the target respiratory phase PT from each couch position, the sorted image slices are used to construct a 3D CT image for said target respiratory phase.

In the above-described methods for sorting CT image slices and the above-described methods for constructing 3D CT image, by sorting an image slice that best matches the virtual image slice $S_c$ based on the criterion of breathing feature value difference and/or image difference, the sorted image slice looks like an image slice between image slices $S_a$ and $S_b$, and accordingly the defect in the 3D CT images caused by insufficient sampling is significantly reduced.

Figure 5:
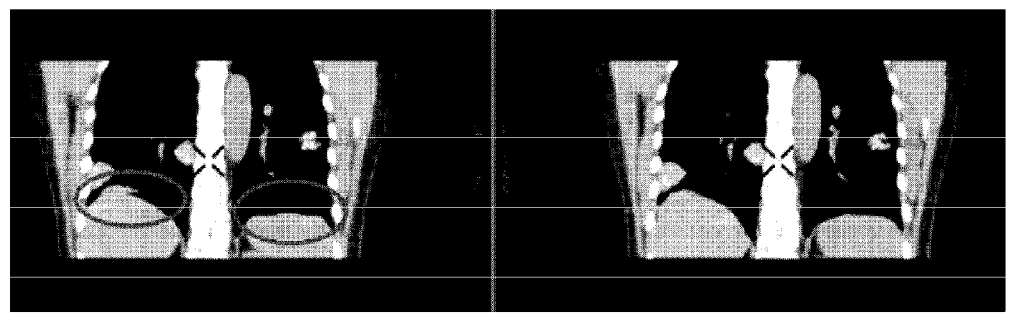
FIGS. 5A-5B show comparisons between the 3D CT images obtained by using the technology according to an embodiment of the present invention and those without using said technology.
Figure 5:
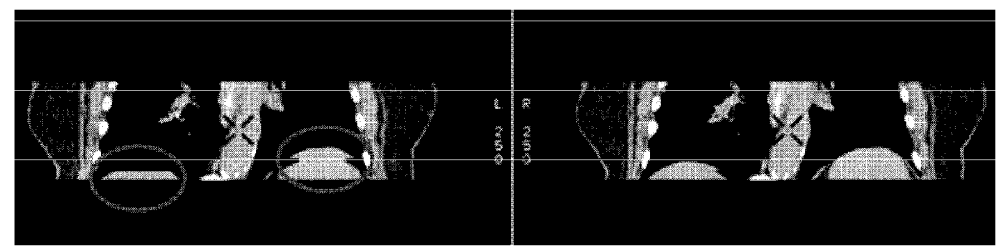

FIGS. 5A-5B schematically show comparisons between the 3D CT images obtained using the technology of the present invention and those without using said technology. As can be seen from FIG. 5, the organ contour distortion and surface split caused by insufficient sampling are eliminated.

By carrying out the embodiments of the present invention, artifacts in 3D CT images are reduced and this leads to higher customer confidence in the product using embodiments of the present invention. Besides, the method according to the embodiments of the present invention is totally automatic, fast, and accurate. It can improve the efficiency and performance of 4D CT products, regardless of external device-based or device-less 4D CT products. To find out the real causes of impacts due to insufficient sampling rate is not easy and requires a lot of experimental work than just theory or paper learning. Embodiments of the present invention are figured out with inventive efforts based on a great deal of experimentation and continuous deep speculation.

Embodiments of the present invention provides a virtual interpolated compensation technology, which can successfully improve 4D CT sorting result performance by compensating the defect caused by sparse sampling.

According to an embodiment of the present invention, there is provided a method for sorting CT image slices, the method comprising determining a breathing feature value and a respiratory phase for each image slice; for a target respiratory phase, sorting an image slice having said target respiratory phase from a plurality of image slices at each couch position for constructing a 3D CT image for said target respiratory phase, and if there is no image slice having said target respiratory phase in all the image slices at a certain couch position, then determining a target breathing feature value corresponding to said target respiratory phase based on a respiratory motion curve of the patient scanned; searching from all the image slices at said couch position for one or more image slices having a breathing feature value close to said target breathing feature value to serve as candidate image slices; and selecting, based on a difference between the breathing feature value of each candidate image slice and the target breathing feature value and/or an image difference between each candidate image slice and a reference image slice, one image slice from said candidate image slices for constructing a 3D CT image for said target respiratory phase.

According to an embodiment of the present invention, selecting, based on the breathing feature value difference between the breathing feature value of each candidate image slice and the target breathing feature value and/or an image difference between each candidate image slice and a reference image slice, one image slice from said candidate image slices comprises one of the following: selecting from said candidate image slices an image slice having a breathing feature value with a minimum breathing feature value difference from the target breathing feature value for constructing the 3D CT image for said target respiratory phase; selecting from said candidate image slices an image slice having a minimum image difference from the reference image slice for constructing the 3D CT image for said target respiratory phase, and selecting from said candidate image slices an image slice having a minimum combined difference value with respect to the breathing feature value difference and the image difference for constructing the 3D CT image for said target respiratory phase.

According to an embodiment of the present invention, the method comprises selecting from all the image slices at said couch position a first reference image slice and a second reference image slice in the following manner as the reference image slice: the first reference image slice and the second reference image slice are two adjacent image slices in terms of the scan time, and a virtual scan time corresponding to the target respiratory phase falls between the scan time of the first reference image slice and the scan time of the second reference image slice.

According to an embodiment of the present invention, selecting from said candidate image slices an image slice having a minimum image difference from the reference image slice for constructing the 3D CT image for said target respiratory phase comprises for each candidate image slice, calculating a first image difference between said candidate image slice and the first reference image slice and a second image difference between said candidate image slice and the second reference image slice, respectively; for each candidate image slice, multiplying the first image difference and the second image difference by a respective weight respectively; for each candidate image slice, selecting a bigger one from the first image difference and the second image difference having the respective weight multiplied as the image difference between said candidate image slice and the reference image slice; and selecting from said candidate image slices an image slice having a minimum image difference from the reference image slice for constructing the 3D CT image for said target respiratory phase.

According to an embodiment of the present invention, selecting from said candidate image slices an image slice having a minimum combined difference value with respect to the breathing feature value difference and the image difference for constructing the 3D CT image for said target respiratory phase comprises for each candidate image slice, calculating a breathing feature value difference between the breathing feature value of said candidate image slice and the target breathing feature value; normalizing the breathing feature value differences for all candidate image slices to obtain a normalized breathing feature value difference for each candidate image slice; for each candidate image slice, calculating a first image difference between said candidate image slice and the first reference image slice and a second image difference between said candidate image slice and the second reference image slice, respectively; for each candidate image slice, multiplying the first image difference and the second image difference by a respective weight respectively; for each candidate image slice, selecting a bigger one from the first image difference and the second image difference having the respective weight multiplied as the image difference between said candidate image slice and the reference image slice; normalizing the image differences for all candidate image slices to obtain a normalized image difference for each candidate image slice; summing the normalized breathing feature value difference and the normalized image difference for each candidate image slice to obtain a combined difference value for each candidate image slice, and selecting from said candidate image slices an image slice having the minimum combined difference value for constructing the 3D CT image for said target respiratory phase.

According to an embodiment of the present invention, the sum of the weight of the first image difference and the weight of the second image difference is 1, and the greater the difference between the breathing feature value of the first reference image slice and the target breathing feature value, the smaller the weight of the first image difference; and the greater the difference between the breathing feature value of the second reference image slice and the target breathing feature value, the smaller the weight of the second image difference.

According to an embodiment of the present invention, the first and second reference image slices are included in the candidate image slices.

According to another aspect of the present invention, there is provided a method for constructing a 3D CT image, the method comprising: for a target respiratory phase, sorting, using the method for sorting CT image slices described above, an image slice from a plurality of image slices at each couch position for constructing a 3D CT image for said target respiratory phase, and using the sorted image slices to construct the 3D CT image.

Through the above methods according to embodiments of the present invention, it is possible to reduce or eliminate the defects in 3D CT images in 4D CT caused by insufficient sampling rate.

Although specific embodiments of the present invention have been described above with reference to the drawings, persons skilled in the art would appreciate that various changes, modifications, and equivalent substitutions can be made to the present invention without departing from the spirit and scope of the present invention. All these changes, modifications, and equivalent substitutions shall fall within the spirit and scope as defined in the appended claims.

What is claimed is:

1. A method for sorting CT image slices, comprising:
determining a breathing feature value and a respiratory phase for each image slice of the CT image slices, wherein the CT image slices comprise a plurality of image slices at each of a plurality of couch positions; and,
for a target respiratory phase, sorting an image slice comprising the target respiratory phase from the plurality of image slices at each of the plurality of couch positions for constructing the 3D CT image for the target respiratory phase,
wherein, if no image slice comprises the target respiratory phase at a couch position, the method further comprises:
determining a target breathing feature value corresponding to the target respiratory phase based on a respiratory motion curve of a scanned patient;
searching from the plurality of image slices at the couch position for one or more image slices comprising a breathing feature value close to the target breathing feature value to serve as candidate image slices; and
selecting, based on a breathing feature value difference between the breathing feature value of each of the candidate image slices and the target breathing feature value and/or an image difference between each of the candidate image slices and at least one reference image slice, a single image slice from the candidate image slices for constructing the 3D CT image for the target respiratory phase.

2. The method according to claim 1, wherein selecting, based on the breathing feature value difference between the breathing feature value of each of the candidate image slices and the target breathing feature value and/or the image difference between each of the candidate image slices and the at least one reference image slice, the single image slice from the candidate image slices comprises one of the following:
selecting from the candidate image slices an image slice comprising a breathing feature value with a minimum breathing feature value difference from the target breathing feature value for constructing the 3D CT image for the target respiratory phase;
selecting from the candidate image slices an image slice comprising a minimum image difference from the at least one reference image slice for constructing the 3D CT image for the target respiratory phase; and selecting from the candidate image slices an image slice comprising a minimum combined difference value with respect to the breathing feature value difference and the image difference for constructing the 3D CT image for the target respiratory phase.

3. The method according to claim 2, wherein the at least one reference image slice comprises a first reference image slice and a second reference image slice, wherein the first reference image slice and the second reference image slice are selected from the plurality of image slices at the couch position and are two adjacent image slices in terms of the scan time, wherein a virtual scan time corresponding to the target respiratory phase falls between the scan time of the first reference image slice and the scan time of the second reference image slice.

4. The method according to claim 3, wherein selecting from the candidate image slices an image slice comprising a minimum image difference from the at least one reference image slice for constructing the 3D CT image for the target respiratory phase comprises:

for each of the candidate image slices, calculating a first image difference between the candidate image slice and the first reference image slice and a second image difference between the candidate image slice and the second reference image slice, respectively;

for each of the candidate image slices, multiplying the first image difference and the second image difference by a respective weight respectively;

for each of the candidate image slices, selecting a greater image difference from the first image difference and the second image difference having the respective weight multiplied as the image difference between the candidate image slice and the at least one reference image slice; and selecting from the candidate image slices an image slice comprising a minimum image difference from the at least one reference image slice for constructing the 3D CT image for the target respiratory phase.

5. The method according to claim 4, wherein the sum of the weight of the first image difference and the weight of the second image difference is 1, and wherein the greater the difference between the breathing feature value of the first reference image slice and the target breathing feature value, the smaller the weight of the first image difference, and the greater the difference between the breathing feature value of the second reference image slice and the target breathing feature value, the smaller the weight of the second image difference.

6. The method according to claim 3, wherein selecting from the candidate image slices an image slice comprising a minimum combined difference value with respect to the breathing feature value difference and the image difference for constructing the 3D CT image for the target respiratory phase comprises:

for each of the candidate image slices, calculating a breathing feature value difference between the breathing feature value of the candidate image slice and the target breathing feature value;

normalizing the breathing feature value differences for all of the candidate image slices to obtain a normalized breathing feature value difference for each of the candidate image slices;

for each of the candidate image slices, calculating a first image difference between the candidate image slice and the first reference image slice and a second image difference between the candidate image slice and the second reference image slice, respectively;

for each of the candidate image slices, multiplying the first image difference and the second image difference by a respective weight respectively;

for each of the candidate image slices, selecting a bigger image difference from the first image difference and the second image difference having the respective weight multiplied as the image difference between the candidate image slice and the at least one reference image slice;

normalizing the image differences between each of the candidate image slices and the at least one reference image slice for all of the candidate image slices to obtain a normalized image difference for each of the candidate image slice;

summing the normalized breathing feature value difference and the normalized image difference for each of the candidate image slices to obtain a combined difference value for each of the candidate image slices, and selecting from the candidate image slices an image slice comprising the minimum combined difference value for constructing the 3D CT image for the target respiratory phase.

7. The method according to claim 6, wherein the sum of the weight of the first image difference and the weight of the second image difference is 1, and wherein the greater the difference between the breathing feature value of the first reference image slice and the target breathing feature value, the smaller the weight of the first image difference, and the greater the difference between the breathing feature value of the second reference image slice and the target breathing feature value, the smaller the weight of the second image difference.

8. The method according to claim 3, wherein the first reference image slice and the second reference image slice are included in the candidate image slices.

* * * * *